Patented Oct. 4, 1932

1,881,347

UNITED STATES PATENT OFFICE

HEINRICH BERTSCH, OF CHEMNITZ, GERMANY, ASSIGNOR TO H. TH. BOHME A. G., OF CHEMNITZ, GERMANY, A COMPANY OF GERMANY

METHOD OF RENDERING HIGHER ALCOHOLS SOLUBLE

No Drawing. Application filed June 11, 1927, Serial No. 198,308, and in Germany June 15, 1926. Renewed June 8, 1932.

This invention relates to a method of rendering higher alcohols soluble. More particularly, the invention is concerned with dissolving alcohols comprising four or more carbon atoms.

As is well-known, the higher alcohols, such as the normal iso and secondary butyl-alcohols, amyl-alcohols, cyclo-hexanols, hydronaphthols and the like, which are either insoluble in water or soluble only with great difficulty, possess valuable properties when employed in various technical processes particularly the numerous processes in connection with the textile industry. Consequently, preparations which gave either clear solutions in water or at least permanent emulsions of the alcohols were produced by the use of soaps, Turkey red oil, alkalized aromatic sulfo-acids, and the like as solution agents for the said alcohols.

Dissolving agents of the kind referred to fail, however, when the alcohols in question are to be employed in rather strong caustic alkali solutions and acids, as for example in mercerizing baths or carbonizing acid baths. In such employment, the dissolving agents referred to are salted out by strong concentrated caustic alkali solutions and are decomposed by acids, and separate out upon the surfaces of the baths. No materially better effect is obtained, even with an addition to the higher alcohols of lower water-soluble alcohols intended to act as dissolving agents. Thus, for example, the solubility of n-butyl alcohol in a technical NaOH solution of 30° Bé. is scarcely raised by additions of methyl or ethyl alcohols, for after a short while the n-butyl alcohol separates again upon the surface of the solution.

An important object of the invention is to obtain useful and practical solutions of water insoluble or difficultly soluble alcohols of four, or more than four, carbon atoms which do not give up the alcohols even under the circumstances hereinbefore referred to.

A further object of the invention is to improve treatment baths employed for various technical processes by including in such baths the alcohol products of the invention.

According to this invention, an appropriate alcohol is treated with a dispersion agent which is obtained as a product when sulphonating fats or fatty acids in the presence of concentrated aliphatic acids, acid anhydrides, or acid chlorides.

Solutions of the higher alcohols produced in this manner still dissolve clearly in lyes (caustic alkali solutions) up to 34° Bé and in sulphuric acid of 4–6° Bé (carbonizing acid) and may be added in any desired amount. The wetting of cotton piece goods in mercerizing baths containing such additions takes place suddenly, and a completely uniformly mercerized material of very beautiful lustre is obtained. The same wetting effect occurs in the treatment of wool with carbonizing acid to which an addition of this mixture has been made.

The preparations so obtained are, however, of especial value in vat dyeing. They dissolve clearly in any proportion even in strong alkaline vats and exercise, therefore, their efficacy in promoting the solution of the dye and in increasing the degee of dispersion and the permanence of the vats to a substantial extent.

The sulphonated fats or oils employed according to the improved method may be produced for example as follows:—

300 kilograms of castor-oil-fatty acid
250 kilograms of water-free butyric acid
500 kilograms of 96% sulphuric acid are allowed to act on one another while cooling, the temperature preferably being kept below zero; after reaction has occurred washing at 0 to 10° C., and neutralization are effected as is usual in the manufacture of Turkey red oil. The production of the sulphonates is effected in a precisely analogous manner, using for example, acetic anhydride or its homologues or propionyl-chloride or the like.

Another example would be the following:

300 kgs. of fatty acids of castor oil
300 kgs. of acetic anhydrid or propionyl chloride
300 kgs. of $H_2SO_4$ (96%) at 0 to 5° C.

The fatty acid chlorides, as mentioned, constitute the most prominent examples of fatty acide halides, and the invention is not restricted to the chlorides.

The following two examples may be given for the production of the preparations from the higher alcohols and the sulphonates recovered by sulphonating fats or oils in the presence of aliphatic acids or acid anhydrides, (e. g. water-free butyric acid or acetic anhydride).

Example 1

25 parts of sulphonate (as per last paragraph)
10 parts of water-insoluble butyl alcohol
65 parts of water give a clear solution which may be employed in the manner stated above.

Example 2

60 parts of sulphonate (as in Example 1)
15 parts of water-insoluble amyl alcohol
15 parts of cyclo-hexanol give a clear solution which dissolves clearly in water, alkali solutions, and diluted acids of the concentration given in the specification.

I claim:—

1. Method of imparting solubility to a higher alcohol of not less than 4 carbon atoms and not readily soluble by itself, comprising the addition to such alcohol of a sulphonate obtained by sulphonating a fatty substance in the presence of a substance selected from the herein described group consisting of substantially anhydrous lower fatty acids of the saturated series, and their anhydrides and halides.

2. Method of imparting solubility to a higher alcohol of not less than 4 carbon atoms and not readily soluble by itself, comprising the addition to such alcohol of a sulphonate obtained by sulphonating a fatty substance in the presence of acetic anhydride.

3. Method of imparting solubility to a higher alcohol of not less than 4 carbon atoms and not readily soluble by itself, comprising the addition to such alcohol of a sulphonate obtained by sulphonating ricinoleic acid in the presence of a substance selected from the herein described group consisting of substantially anhydrous lower fatty acids of the saturated series, and their anhydrides and halides.

4. Method of imparting solubility to a higher alcohol of not less than 4 carbon atoms and not readily soluble by itself, comprising the addition to such alcohol of a sulphonate obtained by sulphonating a fatty substance in the presence of a substance selected from the herein described group consisting of substantially anhydrous lower fatty acids of the saturated series, and their anhydrides and halides and adding such product to a textile treating bath.

5. A composition of matter consisting of a stable solution of a higher alcohol of not less than 4 carbon atoms and not readily soluble by itself, rendered stably soluble by the addition thereto of a dispersing agent consisting of a sulphonate obtained by sulphonating a fatty substance in the presence of a substance selected from the herein described group consisting of substantially anhydrous lower fatty acids of the saturated series, and their anhydrides and halides.

HEINRICH BERTSCH.